Dec. 29, 1959     H. G. McCARTY     2,918,774
CROP TREATING APPARATUS
Filed Nov. 20, 1957
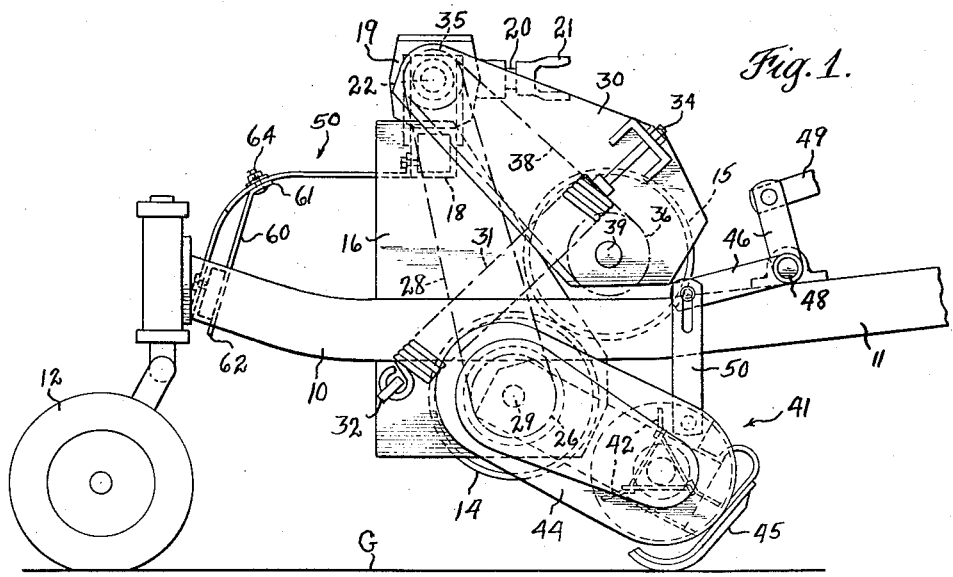
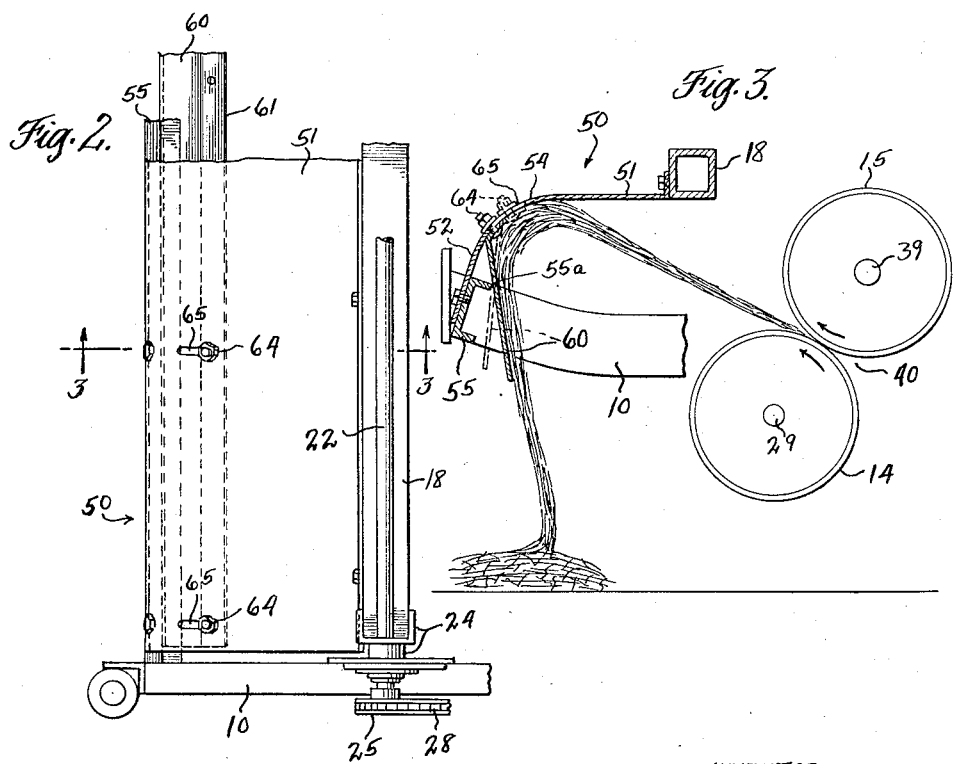
INVENTOR
HORACE G. McCARTY
Joseph Allen Brown
ATTORNEY United States Patent Office 2,918,774
Patented Dec. 29, 1959

2,918,774

CROP TREATING APPARATUS

Horace G. McCarty, New Holland, Pa., assignor to Sperry Rand Corporation, New Holland, Pa., a corporation of Delaware Application November 20, 1957, Serial No. 697,604

6 Claims. (Cl. 56—1)

The present invention relates to agricultural machines used for conditioning mowed hay by crushing and cracking the stems to accelerate drying.

A machine of this type customarily employs cooperative, opposed, crop treating members, such as rolls, between which mowed hay is delivered as it comes from a pick-up mechanism when the machine is drawn over a field. The crop material is discharged rearwardly after being treated. As the material leaves the crop treating members, it is usually directed rearwardly with a considerable force. There is a tendency for the material to move parallel to the ground and gradually settle down on the ground in a compressed mat. This is undesirable because while the passing of the material between the crop treating members conditions the crop and thereby tends to accelerate drying, the depositing of the material in a mat close to the ground prevents air from readily circulating through the material thereafter to finish the field drying procedure.

It is a primary object of this invention to provide means for engaging the crop material as it comes from the crop treating members and directing it toward the ground whereby the hay stems hit the ground on end causing them to tumble like jack straws into a loose, easily aerated swath.

Another object of this invention is to provide crop engaging means of the character described which is adjustable to vary the deflection of the crop material, depending on prevailing harvesting conditions.

Another object of this invention is to provide crop engaging means which may be adjusted with a minimum of time and effort.

A further object of this invention is to provide a structure which will accomplish the aforementioned objects with a minimum of cost.

Other objects of this invention will be apparent hereinafter from the specification and from the recital in the appended claims.

In the drawing:

Fig. 1 is a fragmentary side elevation of a crop treating machine having a fluffing attachment constructed according to this invention;

Fig. 2 is a fragmentary plan view of Fig. 1; and

Fig. 3 is a fragmentary, generally diagrammatic section taken on the line 3—3 of Fig. 2 and illustrating the operation of the fluffing attachment, the attachment being illustrated in one operative position in solid lines and in a second operative position in dotted lines.

Referring now to the drawing by numerals of reference, 10 denotes a supporting frame having a forward end 11 connectable to and supportable by a tractor or other power implement, not shown. The rear end of frame 10 is supported on a pair of laterally spaced ground wheels, one of which 12 is shown. The frame is adapted to be drawn across a field of cut crop material, being moved from left to right in Fig. 1.

Rotatably mounted on frame 10 and extending transversely relative to the direction of travel of the frame are a pair of cooperative crop treating members in the form of crusher rolls, namely, lower roll 14 and upper roll 15. Lower roll 14 is journaled in a pair of laterally spaced plates 16 extending vertically relative to frame 10 and rigidly affixed thereto. The upper ends of plate 16 support a transverse bar 18 on which a gear box 19 is mounted. Gear box 19 receives power through a shaft 20 universally connected through a suitable power-take-off mechanism to the tractor which tows the implement. One universal link of this mechanism is shown at 21.

Gear box 19 has suitable, conventional bevel gearing through which power is transmitted to a pair of coaxial output drive shafts 22, one extending from each side of the gear box and supported at its outer end in a pedestal-bearing 24. The outer end of the shaft 22 at the right side of the machine, when the machine is viewed from the rear, has a sprocket 25 keyed to it. Sprocket 25 drives a sprocket 26 through an endless chain 28. Sprocket 26 is keyed to a shaft 29 of lower roll 14.

Upper roll 15 is carried on support plates 30, one at each side of the machine and pivotally supported for swinging movement about the axis of shafts 22. Upper roll 15 is urged by the force of gravity against the lower roll 14. Further, it is resiliently urged toward the lower roll by a spring 31 connected at 32 to plate 16 and adjustably fastened at 34 to plate 30.

The shaft 22 extending from the left side of gear box 19, when the machine is viewed from the rear, has a sprocket 35 keyed to it. Sprocket 35 drives a sprocket 36 through an endless chain 38. Sprocket 36 is keyed to a shaft 39 at the left end of the upper roll.

The rotation of endless chains 28 and 38 is such that the crop treating members 14 and 15 are rotated as indicated by the arrows in Fig. 3, whereby material delivered to the throat 40 in front of the rolls is passed between the rolls and ejected rearwardly.

Any suitable means may be provided for picking up cut crop material from the ground and delivering it to the throat 40. In the drawing, a rotatable pick-up 41 is illustrated having three transverse crop engaging members 42 which lift the crop material as the pick-up rotates and deliver it upwardly and rearwardly. The pick-up 41 is carried on a pair of pivoted plates 44, one at each side of the machine. Plates 44 are pivotally supported by any suitable means for pivotal adjustment about the axis of lower roll 14. A runner 45 is provided at each end of the pick-up so that it will follow the contour of the ground as the machines moves along.

To raise or lower the pick-up, a bell crank 46 is provided. This bell crank is pivotal about a cross-shaft 48 carried on the forward end 11 of frame 10. One arm of the bell crank is connected through a lever 49 to the operator on the tractor. A depending link 50 connects the other arm of the bell crank to the pick-up. It will be apparent that rotation of the bell crank in a forward direction will elevate the pick-up, while rotation of the bell crank in a rearward direction will lower it.

The structure thus far described plays no part in the present invention other than to provide the environment of the claimed deflector attachment. Such attachment will now be described.

Connected to cross bar 18 and extending rearwardly therefrom is a hood 50 having a top wall 51, a rear wall 52 and an interconnecting curved wall portion 54. Top wall 51 extends generally parallel to the ground G and provides a first material engaging surface. The rear wall 52 is downwardly and rearwardly inclined. Rear wall 52 is connected to a transverse support 55 which is U-shaped in cross section. As shown in Fig. 3, the open end of the U extends forwardly.

Disposed inside of hood 50 is a deflector member 60 in the form of an imperforate baffle plate which provides a second material engaging surface. In one position, member 60 extends generally parallel to the rear wall 52 of hood 50 (Fig. 1). The member has an upper end 61 and a lower edge 62, both of which extend generally horizontal relative to the ground. Upper end 61 is connected by fasteners 64, comprising nuts and bolts, to the arcuate portion 54 of hood 50. The bolt of each fastener extends through a fore-and-aft extending slot 65 (Fig. 2) in hood 50. It will be apparent that upon loosening the fasteners, the member 60 may be adjusted rearwardly from the position shown in Fig. 1 to the position shown in dotted lines in Fig. 3, or to the rearward extreme position as shown in solid lines in Fig. 3, or to any other intermediate position.

The material being discharged rearwardly from the crop treating members is directed toward the top wall 51 of hood 50, coming into engagement with the hood adjacent the curved portion 54 (Fig. 3). Wall 51 limits the upward rearward travel of the material. However, because of the wall's extension relative to the stream of material the wall merely deflects the flow, as shown in Fig. 3. It does not stop it. The curved area tends to deflect the crop material from moving in a rearward direction and directs it downwardly. The exact direction in which the crop material travels as it moves down to the ground is controlled by the adjusted position of the member 60. The stems of the material are directed so that they land on end, and tumble on contact with the ground, producing a loose aerated swath.

It will be observed from Fig. 3, that when the deflector is adjusted, it pivots about the upper leg 55a of the support 55. This leg engages the back side of the deflector between its upper and lower end. Regardless of the position which the deflector assumes, it is supported by support 55.

Such structure is of utmost simplicity and inexpensive to manufacture. The operator of the machine when wanting to adjust deflector 60 merely has to loosen the fastening devices 64 and adjust the deflector as desired. When in an appropriate position, he merely tightens the fastening means. At all times the deflector is supported by the support 55 against movement from its adjusted position. The support 55 prevents the deflector from bending under the impact of discharged material.

While this invention has been described in connection with a particular embodiment thereof, it will be understood that it is capable of further modification, and this application is intended to cover any variations, uses, or adaptations of the invention following, in general, the principles of the invention and including such departures from the present disclosure as come within known or customary practice in the art to which the invention pertains, and as fall within the scope of the invention or the limits of the appended claims.

Having thus decsribed my invention what I claim is:

1. A hay conditioner comprising a mobile frame, a pair of coacting treating rolls substantially horizontally mounted on said frame, the axes of said rolls lying in a plane which is acute to the horizontal on material receiving side thereof, a deflector adjacent said rolls on the discharge side thereof, said deflector having a generally horizontal material first engaging portion and a generally vertical material second engaging portion.

2. A hay conditioner as recited in claim 1 wherein said deflector is adjustable relative to said coacting treating rolls.

3. A hay conditioner as recited in claim 1 wherein means is provided for connecting said second material engaging portion adjacent said first material engaging portion whereby the second portion may be adjusted relative to the first portion to establish a desired extension of said second portion.

4. A hay conditioner as recited in claim 3 wherein said connecting means includes a plurality of releasable fasteners.

5. A hay conditioner as recited in claim 3 wherein means is provided for supporting said second material engaging portion in adjusted position.

6. A hay conditioner comprising a mobile frame, a pair of coacting treating rolls substantially horizontally mounted on said frame, the axes of said rolls lying in a plane which is acute to the horizontal on the material receiving side of the rolls, a deflector on the discharge side of said rolls having a first material engaging portion adjacent said rolls lying in a generally horizontal plane and at an acute angle to said plane of the roll axes and a second material engaging portion more remote from said rolls and extending downwardly and rearwardly from adjacent the discharge edge of said first material engaging portion.

References Cited in the file of this patent
UNITED STATES PATENTS

| | | |
|---|---|---|
| 2,727,348 | Arend | Dec. 20, 1955 |
| 2,790,289 | Tufford | Apr. 30, 1957 |